United States Patent
Du et al.

[11] Patent Number: 5,864,552
[45] Date of Patent: Jan. 26, 1999

[54] REARRANGEABLE NON-BLOCKING SWITCHING NETWORK

[75] Inventors: Ding-Zhu Du, Minneapolis; Biao Gao, St. Paul, both of Minn.; Frank Kwangming Hwang, Warren; Jeong Han Kim, Edison, both of N.J.

[73] Assignee: Lucent Technologies, Inc., Murray Hill, N.J.

[21] Appl. No.: 711,921

[22] Filed: Sep. 11, 1996

[51] Int. Cl.⁶ .......................... H04L 12/50; H04Q 11/00
[52] U.S. Cl. ............................ 370/388; 370/386
[58] Field of Search ................... 320/369, 360, 320/370, 371, 372, 375, 380, 386, 387, 388

[56] References Cited

U.S. PATENT DOCUMENTS

| | | | |
|---|---|---|---|
| 4,696,000 | 9/1987 | Payne, III | 370/388 |
| 4,807,280 | 2/1989 | Posner et al. | 370/388 |
| 5,631,902 | 5/1997 | Yoshifuji | 370/388 |

OTHER PUBLICATIONS

V.E. Benes, "Mathematical Theory of Connecting Networks and Telephone Traffic" (Academic Press, 1965).

S.P. Chung and K.W. Ross, "On Nonblocking Multirate Interconnection Networks," SIAM J. Comput., 20 pp. 726–736 (1991).

R. Melen and J.S. Turner, "Nonblocking Multirate Networks," SIAM J. Comput., 18 pp. 301–313 (1989).

G. Niestegge, "Nonblocking Multirate Switching Networks," Traffic Engineering for ISDN Design and Planning, pp. 494–458, (1988).

*Primary Examiner*—Chi H. Pham
*Assistant Examiner*—Steven Nguyen

[57] ABSTRACT

A rearrangeable non-blocking three stage network and method for routing one or more requests between an input stage and an output stage, comprising between 3N and substantially the next largest integer of $(41N-E_N)/16$ center stage interconnection units, where N is the greater of the inlet links to the input stage and outlet links from the output stage. Received requests are grouped by load size into a first group, a second group, and a third group with the second ground divided into a first half and a second half. The requests in the first group and first half of the second group are routed by a first set of center interconnection units, and the requests of the second half of the second group are routed by a second set of center interconnection units. The requests of the third group are routed through the first and second set of interconnection units so long as their load capacity is not exceeded, while any remaining small requests are routed through a third set of interconnection units.

12 Claims, 3 Drawing Sheets

REARRANGEABLE NON-BLOCKING SWITCHING NETWORK

FIELD OF THE INVENTION

This invention relates generally to three stage Clos networks. In particular the invention relates to a three stage Clos network with an efficient number of middle stage rearrangeable non-blocking networks.

BACKGROUND OF THE INVENTION

The multistage interconnection network (MIN) is a popular topology for communication and computer networks. The most basic MIN is the three-stage Clos network which is often used as a component for larger networks. One important performance criterion for an interconnection network is its blocking probability. In particular, a zero blocking probability, or non-blockness, is a highly desirable property.

There are generally three types of non-blocking circuits: strictly non-blocking; wide sense non-blocking; and rearrangeable non-blocking. In a rearrangeable non-blocking network, connectivity is guaranteed as a result of the network's ability to rearrange prior connections as new incoming calls are received. A critical issue in designing a rearrangeable non-blocking network is to reduce the number of center stage interconnection units necessary to provide the rearrangeability function and thereby guarantee connectivity for each received request. The prior art has recognized that a rearrangeable non-blocking network can have as little as 3N center stage interconnection units, where N is the greater of the number of inlets per input switch or outlets per outlet switch, as described below.

Each request, which includes all types of communications such as a telephone call and a data communication, is associated with a weight or load which can be thought of as the bandwidth requirement of that request. In a multi-rate environment these loads differ for different requests. A link, whether inlet, outlet or internal, can carry any number of requests as long as the combined load of these requests does not exceed the load capacity of the link.

Each request can be represented mathematically with the three variables x, y, and w, where x is an inlet link, y an outlet link and w is its load. A request frame is a collection of requests such that the total load of all requests in the frame involving a fixed inlet or outlet does not exceed unity.

To discuss routing it is convenient to assume that all links are directed from left to right. Thus a path from an inlet to any outlet always consists of the sequence: an inlet link→an input switch→a first internal link→a center interconnection unit→a second internal link→an output switch→an outlet link. Since the switch is assumed to be nonblocking with fan-out properties i.e., one inlet can be simultaneously connected to any set of outlets, a request (x, y, w) is routable only if there exists at least one path of links from x to y, where every link on the path can carry the load of the request without exceeding its load capacity. In other words, every link on the path must have unused capacity of at least 1-w before carrying the request. A request frame is routable if there exists a set of paths, one for each request, such that for every link the sum of the loads of all requests being carried on that which does not exceed unity. A network is rearrangeable non-blocking if every request frame is routable.

A critical implementation issue in rearrangeable non-blocking networks is the number of center stage interconnection units necessary to provide the rearrangeable non-blocking function. It is desired to identify and thus construct a switching network having a reduced number of center stage interconnection units while achieving the property of being rearrangeable nonblocking.

SUMMARY OF THE INVENTION

Accordingly, the present invention provides an efficient rearrangeable non-blocking network having a reduced number of center stage interconnection units. In furtherance of this objective a three stage Clos network comprises m, r×r center stage interconnection units where m is substantially equal to $(41N-E_N)/16$, rounded up to the nearest integer and N is the greater of the number of inlet links in each switch in the first/input stage and the number of outlet links from each switch in the last/output stage, and $E_N$ equals 8, 5, 6, 3, if N is congruent to mod 4 (0,1,2,3). Each center stage interconnection unit can be a single switch or a three stage network, each of which has substantially $(41N-E_N)/16$ center stage interconnection units. Where the load capacity of the inlet links is greater than the load capacity of the internal links between the input stage and the center stage, each request is divided by P, where P equals the nearest integer ratio of the inlet load capacity to internal load capacity, and each 1/P part of each request is routed to a different one of P sets of center stage interconnection units, each having substantially $(41N-E_N)/16$ interconnection units. The received requests are grouped by load size into a first group, second group, and a third group with the second group divided into a first half and a second half. The requests in the first group and half of the second group are routed by a first set of center interconnection units, and the requests of the second half of the second group are routed by a second set of center interconnection units. The requests of the third group are routed through the first and second set of interconnection units so long as their load capacity is not exceeded, while any remaining requests of the third group are routed through a third set of interconnection units.

DETAILED DESCRIPTION OF THE INVENTION

Figure 1:
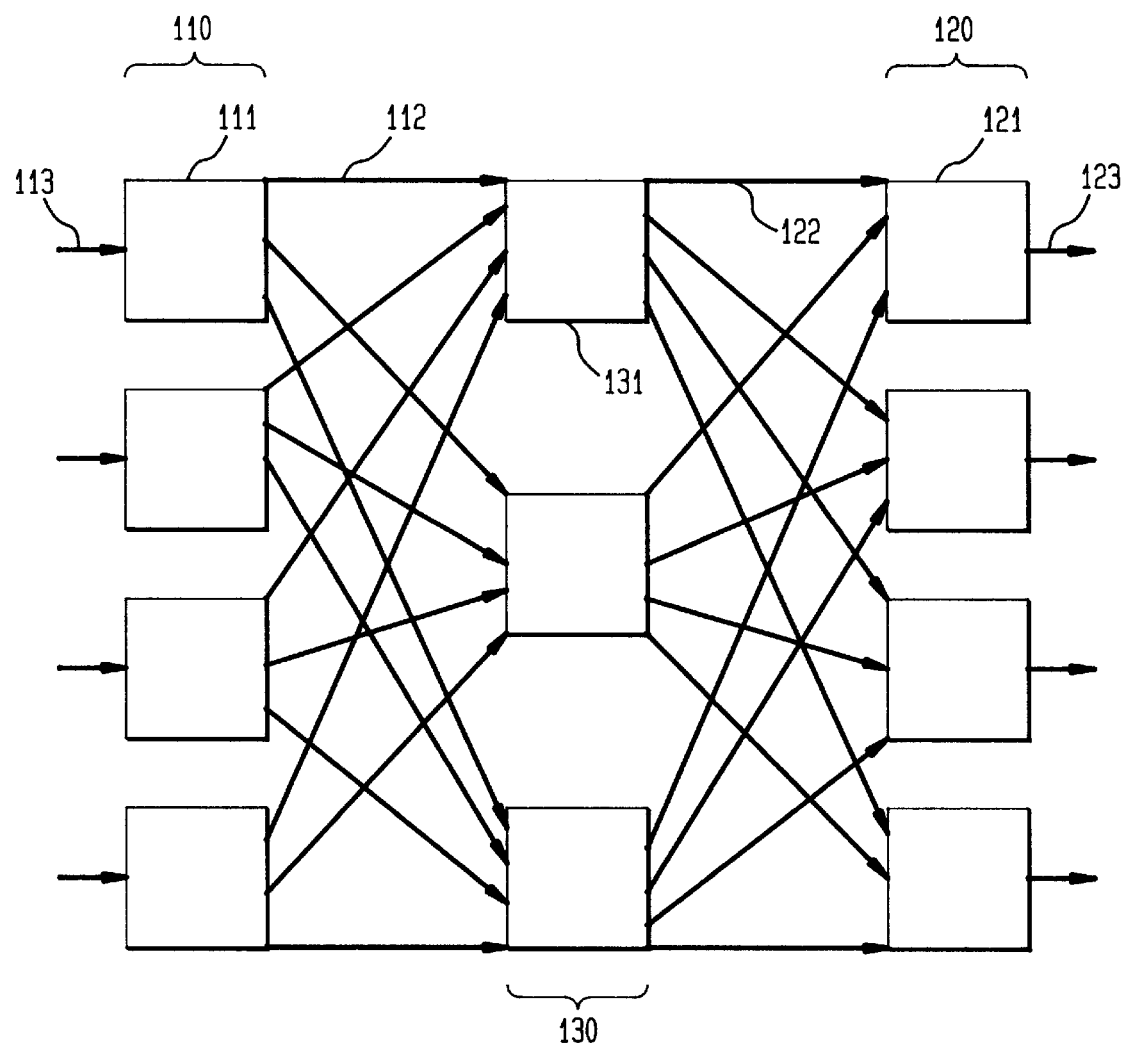
FIG. 1 is a diagram of an exemplary three stage network with one inlet line per input stage switch and three center stage switches.

Referring to FIG. 1, an exemplary symmetric three-stage Clos network for routing communication requests, such as a telephone call or a data modem call, between an input stage 110 and output stage 120 via a center stage 130 is shown where input stage 110 and output stage 120, each consist of four, one by three switches 111 and 121 respectively, and center stage 130 consists of three, four by four interconnection units 131. In one embodiment of this network the input and output switches 111 and 121 are cross bar switches. The number of input stage 110 and output stage 120 switches can be denoted with the variables r, while their input to output size can be denoted with the notation n×n. Likewise, the center stage 130 interconnection units 131 can be denoted as m, r×r interconnection units. An interconnection unit as used herein includes both an individual switch such as a crossbar switch, as well as a network of switches. A single three stage network can be represented with the notation C (n, m, r), where n represents the number of inlet links 113 carrying one or more requests to each input switch 111 and "m" represents the number of center interconnection units 131. Although it is not necessary that there be the same number of inlet links 113 as there are outlet links 123, in a symmetrical network they are the same. Each of the m interconnection units 131 are connected to each of the input switches 111 through r first internal links 112, and connected to each of the output switches 121 through r second internal links 122. Although FIG. 1 shows an equal number of first internal links and second internal links, as is the case for a symmetrical three stage network, the present invention, however, applies even to non-symmetrical networks.

As shown further below it is not necessary to have more than $(41N-E_N)/16$ center stage interconnection units, where $E_n$ equals to 8, 5, 6, 3 if N is congruent to mod 4(0, 1, 2, 3) and where the number of inlet links 113 equals the number of outlet links 123, both represented by the variable N. In an asymmetrical three-stage network with n inlet links and n' outlet links, no more than $(41N-E_N)/16$ center stage interconnection units are necessary for a rearrangeable nonblocking switching network, where N is the greater of n and n'. Where $(41N-E_N)/16$ is a non-integer, the number is raised to the nearest integer. Thus in FIG. 1 where n equals n' equals 1, $(41N-E_N)/16$ is 2.25, and the number of center stage interconnection units is rounded up to three.

Figure 2:
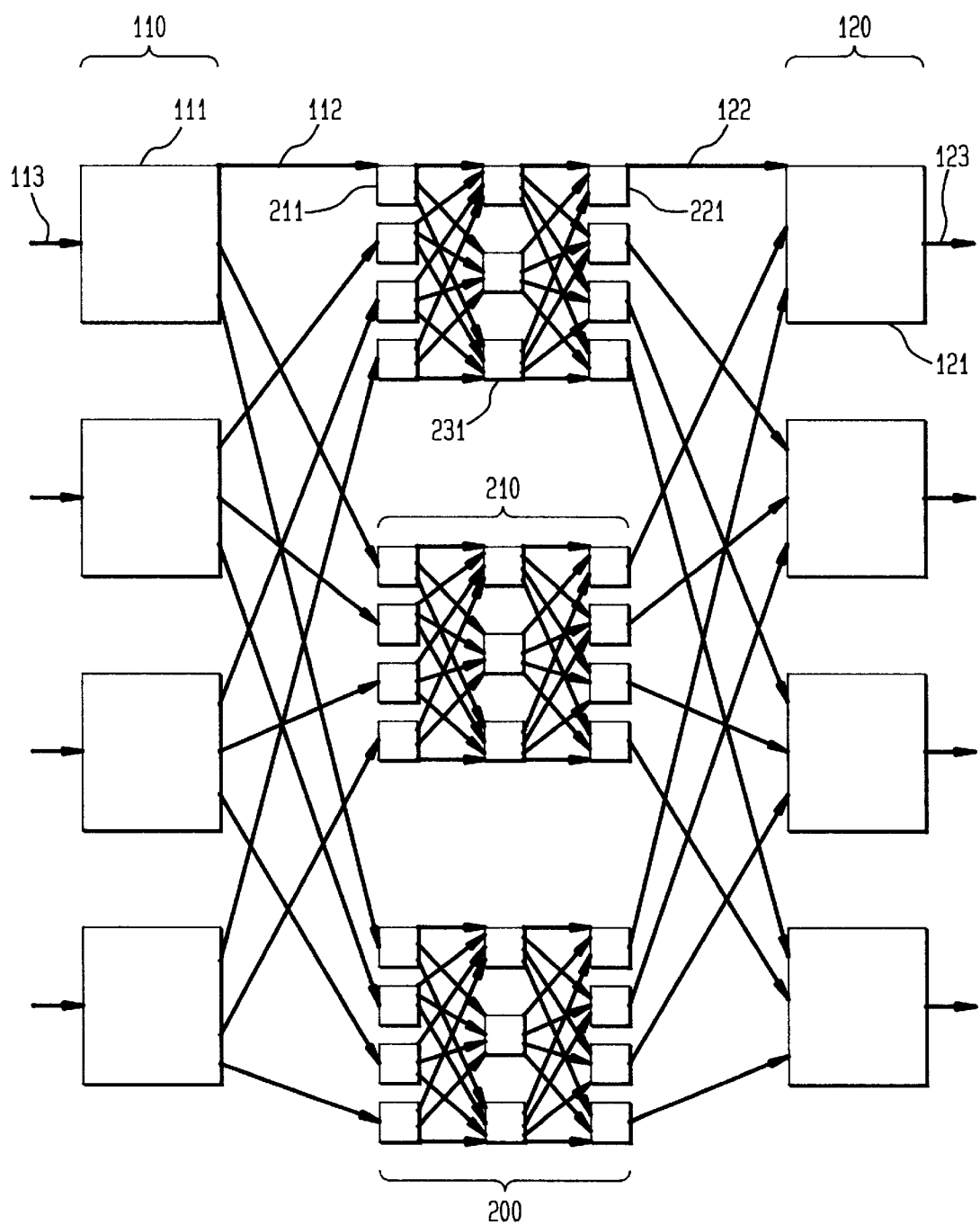
FIG. 2 is a diagram of an exemplary network where the center stage switches are each three stage networks.

Referring to FIG. 2 a five stage rearrangeable nonblocking network is shown according to the present invention. The five stage network comprises input stage 110 and output stage 120, each with inlet links 113 and outlet links 123, respectively, as in the three stage network of FIG. 1. However, the single switches of center stage 130 of the three stage network of FIG. 1 are each replaced with the three stage networks 210 comprising a center stage 200. In similar fashion the number of stages can increase to 7, 9, etc.

As with the three stage network the present invention provides the property of being rearrangeable nonblocking with no more than $(41N-E_N)/16$ center stage interconnection units. The network of FIG. 2 differs from that of FIG. 1 in that the center stage requires no more than $(41N-E_N)/16$ three stage "networks." Thus in FIG. 2 where n equals n' equals 1, center stage 200 comprises 3 center stage "three stage" networks 210. Furthermore each of the center stage networks 210 require no more than $41N'/16$ center interconnection units 231, where N' is the greater of the number of first internal links 112 for each center input switch 211 and the number of second internal links 122 for each center output switch 221.

Figure 3:
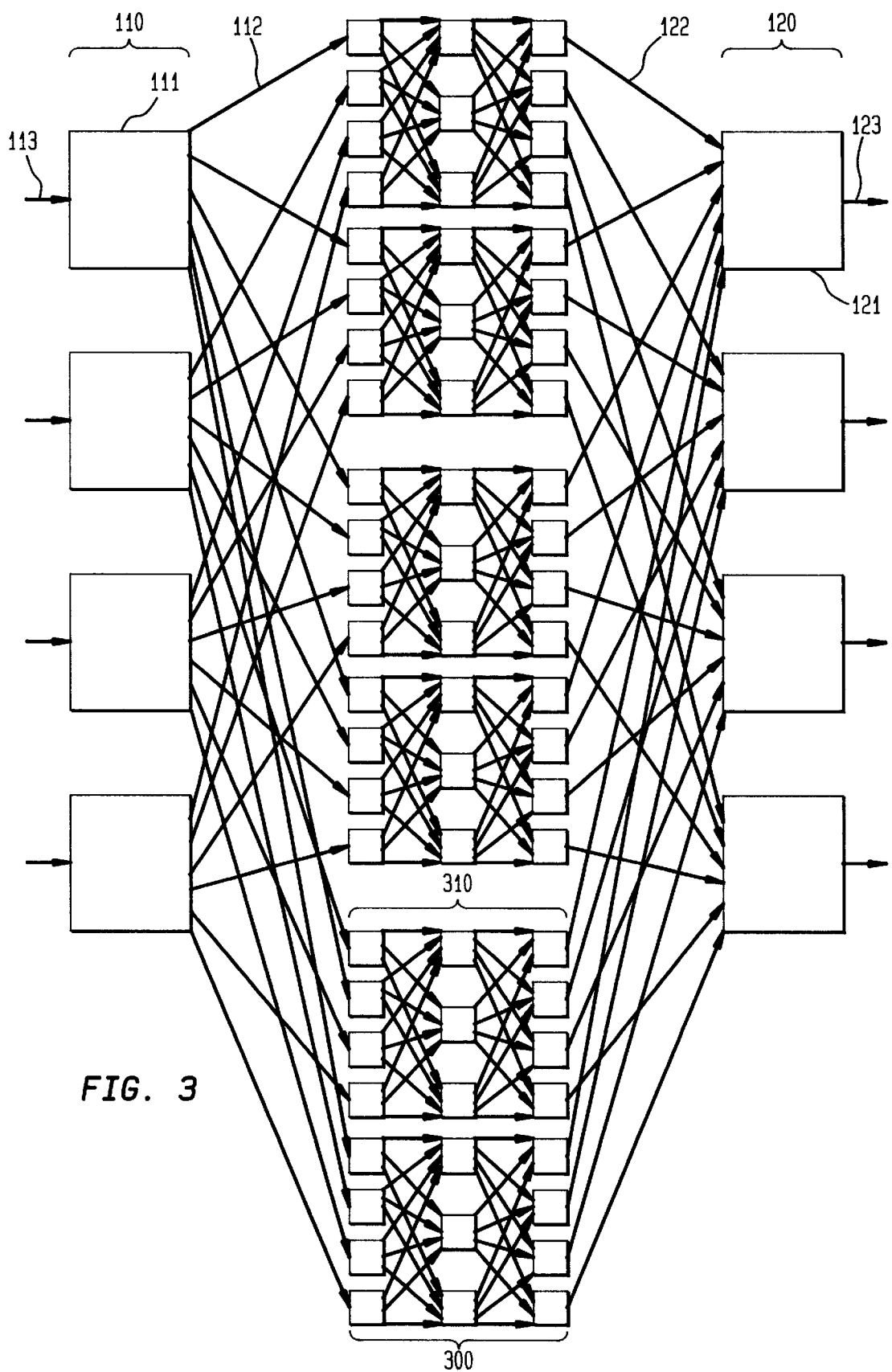
FIG. 3 is a diagram of a multistage network where the center stage switches are each three stage networks and the load capacity of each inlet link is between one to two times that of each internal link between the input and center stages.

The foregoing discussion assumed that inlet links 113, outlet links 123 and first and second internal links 112 and 122, respectively, have the same load capacity. Referring to FIG. 3 an embodiment of the present invention is shown where the inlet and outlet links 113 and 123, respectively, collectively referred to as external links, have a different load capacity than the first and second internal links 112, and 122, respectively, collectively referred to as internal links.

For purposes of illustration, assume each external link has twice the load capacity of each internal link. To maintain the property of rearrangeable nonblocking, each request must be divided in half. Center stage 300 comprises two sets of $(41N'-E_{N'})/16$ interconnection units 310 with each set providing the interconnection between input stage 110 and output stage 120, for half of the load of each request.

Although FIG. 3 shows a five stage network according to the present invention, the principle applies as well to three stage networks, seven stage networks and even larger stage networks. The property of rearrangeable nonblocking is maintained with no more than $(41N'-E_{N'})/16$ center stage interconnection units per set of center interconnection units where the number of sets of center interconnection units substantially equals the ratio of the load capacity of an external link to the load capacity of an internal link. Where this ratio is not an integer, the next largest integer number of sets of center interconnection units is implemented.

When the requests being routed by the rearrangeable network C(n,m,r) have to be rearranged in order to route a new request, the requests being carried can be rearranged with the following preferred routing algorithm. The routing algorithm groups all requests by load size into one of three groups. Large requests, defined by requests whose loads are greater than 0.5 comprise a first group. Medium size requests, defined by loads greater than 0.25, but not greater than 0.5, comprise a second group. A third group comprises small requests whose loads are less than or equal to 0.25.

Since each inlet cannot handle more than one large load, the maximum number of large loads to be routed from a single input switch to a single output switch, denoted by $1_i$, is less than or equal to N. It is also true that the number of medium loads $m_i$ to be routed from an input switch to an output switch is at most $1_i+3(N-1_i)$. This is true because an inlet can carry at most three middle load requests, whose loads are slightly greater than 0.25.

The routing algorithm routes all requests of the first group and half of the requests of the second group through one set of center interconnection units. Thus the number of center interconnection units necessary to route the large requests and the half of the medium load size requests is $1_i+\frac{1}{2}(3N-21_i)$, which equals $3N/2$. The second half of the medium load size requests can be routed through $3N/2$ center interconnection units since all of the large requests are being routed through the first set of center interconnection units. Moreover, it is only necessary to have $3N/4$ center interconnection units route half of the second group of requests, since their load sizes do not exceed 0.5 and each center interconnection unit can route two medium size requests from this group. Consequently, all of the medium size and large size requests can be routed with $3N/2$ plus $3N/4$, which equal $9N/4$ center interconnection units.

It can be shown that the number of center interconnection units necessary to route the small requests of the third group can be represented by $C=(X-2)/f-(X-2N)$, where X equals the number of center interconnection units routing the first and second groups of requests, $1/f$ equals the maximum load of each small request and where the small requests are first routed through the center interconnection units designated for routing the large and medium size requests until those units have reached capacity. Where all center interconnection units routing the requests of the first and second group are at capacity, then C additional center interconnection units are available for routing these small requests. Consequently where $X=9N/4$ as shown above and $f=4$, $(5N-8)/16$ additional center interconnection units are necessary to route the small requests. Thus a total of $41N-E_N/16$ center interconnection units are all that are necessary to provide a multi-rate rearrangeable nonblocking network.

The foregoing merely illustrates the principles of the present invention. Those skilled in the art will be able to devise various modifications, which although not explicitly described or shown herein, embody the principles of the invention and are thus within its spirit and scope.

What is claimed is:

1. A rearrangeable non-blocking network comprising:
   an input stage, said input stage comprising r input switches and n inlet links for each of said r input switches, said n inlet links for receiving one or more requests;
   an output stage, said output stage comprising r' output switches and n' outlet links for each of said r' output switches, said n' outlet links for transmitting said received requests; and a center stage for routing said one or more requests from said input stage to said output stage, said center stage comprising between 3N and substantially the next largest integer of $(41N-E_N)/16$ center interconnection units where N equals the greater of n and n', wherein $E_n$ equals 8, 5,6, 3, if N is congruent to mod4(0, 1, 2, 3) r first internal links coupling each of said center interconnection units to each of said r input switches and r' second internal links coupling each of said output switches to each of said center interconnection units.

2. A network according to claim 1 wherein said r input switches and r' output switches are substantially the same number of switches.

3. A network according to claim 1 wherein said n inlet links and n' outlet links are substantially the same number of links and N equals n.

4. A network according to claim 1 wherein each of said center stage interconnection units further comprises one or more center stage rearrangeable non-blocking networks.

5. A network according to claim 4 wherein each of said center stage rearrangeable non-blocking networks comprises:
 an input stage, said input stage comprising a input switches and b inlet links for each of said a input switches, said b inlet links for receiving one or more requests;
 an output stage, said output stage comprising a' output switches and b' outlet links for each of said a' output switches, said b' outlet links for outputting said received requests;
 a center stage for routing said one or more requests from said input stage to said output stage, said center stage comprising between 3N and substantially the next largest integer of $(41N-E_N)/16$ center interconnection units where N equals the greater of b and b', a first internal links connecting each of said center interconnection units to each of said a input switches and a' second internal links connecting each of said output switches to each of said a' center interconnection units.

6. A network according to claim 1 wherein each of said center interconnection units is an r×r' interconnection switch.

7. A network according to claim 6 wherein said r×r' interconnection switch is an r×r' crossbar switch.

8. A network according to claim 1 wherein each of said received requests has a load associated therewith, wherein said inlet links, have a first load capacity and said first internal links have a second load capacity, said first load capacity being greater than said second load capacity, and wherein said center stage further comprises P sets of between 3N and substantially the next largest integer of $(41N-E_N)/16$ center interconnection units, where P equals the nearest integer ratio of first load capacity to second load capacity, each of said P sets of between 3N and substantially the next largest integer of $(41N-E_N)/16$ center interconnection units to route 1/P of each of said received requests to said output stage.

9. A method for routing one or more requests between an input stage of switches and an output stage of switches in a multirate rearrangeable non-blocking network, said method comprising the steps of:
 receiving said requests at one of r input switches of said input stage, through one of n inlet links at each of said r input switches;
 transmitting said requests at one of r' output switches of said output stage, through one of n' outlet links at each of said r' output switches; and
 routing each of said requests from said input switch to said output switch through one or more center interconnection units numbering between 3N and substantially the next largest integer of $(41N-E_N)/16$ where N equals the greater of n and n', wherein $E_N$ equals 8, 5, 6, 3, if N is congruent to mod4(0, 1, 2, 3) said center interconnection units are coupled to each of said r input switches through r first internal links, and coupled to each of said r' output switches through r' second internal links.

10. A method according to claim 9 wherein each of said center interconnection units comprise one or more rearrangeable non-blocking networks.

11. A method for routing one or more requests, each of said requests having a load, in a multirate rearrangeable non-blocking network having an input stage, a center stage, and an output stage, wherein said center stage comprises one or more center interconnection units, each of said center interconnection units having one or more first internal links to said input stage and one or more second internal links to said output stage, and each of said first internal and second internal links having a request load capacity said method comprising the steps of:
 grouping each of said requests by load size, so that all large load size requests comprise a first group, all medium load size requests comprise a second group and all small load size requests comprise a third group;
 dividing said medium load size requests of said second group into a first half and a second half;
 routing each of said requests of said first group and said first half of said second group to a first set of interconnection switches of said center stage;
 routing each of said requests of said second half of said second group to a second set of interconnection units of said center stage;
 routing each of said requests of said third group to those of said first internal links of said first and second sets of interconnection units whose load capacity will not be exceeded by carrying said requests of said third group; and
 routing said requests of said third group not routed to said first and second sets of interconnection units, to a third set of interconnection units.

12. A method according to claim 11 wherein said input stage comprises r input switches and n inlet links for each of said r input switches, each of said n inlet links for receiving one or more requests, wherein said output stage comprises r' output switches and n' outlet links for each of said r' output switches, said n' outlet links for outputting one or more of said received requests, and wherein said center stage comprises between 3N and substantially the next largest integer of $(41N-E_N)/16$ center interconnection units, where N equals the greater of n and n', r first internal links coupling each of said center interconnection units to each of said r input switches and r' second internal links coupling each of said output switches to each of said center interconnection units.

* * * * *